INVENTOR.
FRED W. RIDDINGTON
BY
Paul A. Weilein
ATTORNEY

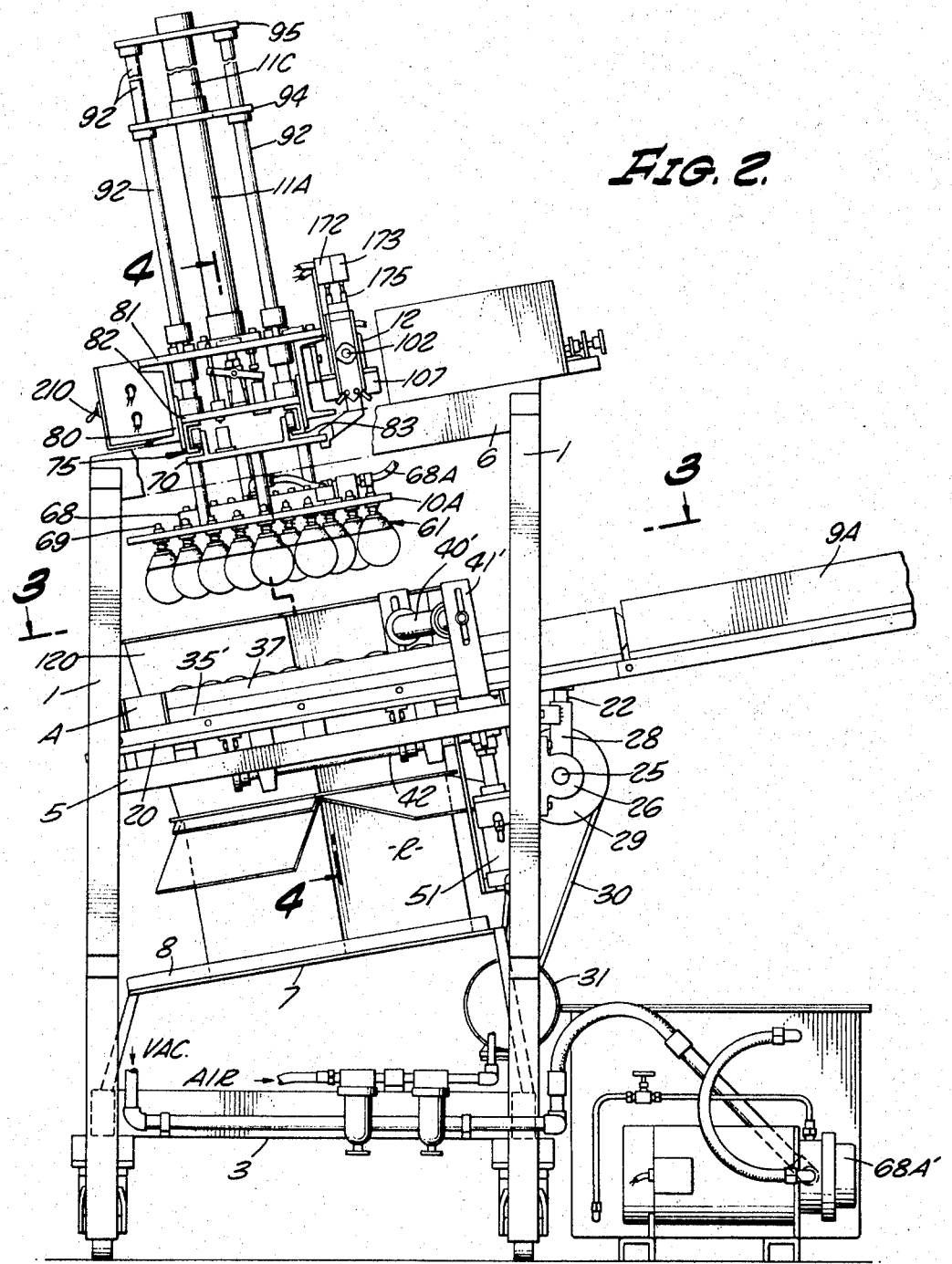

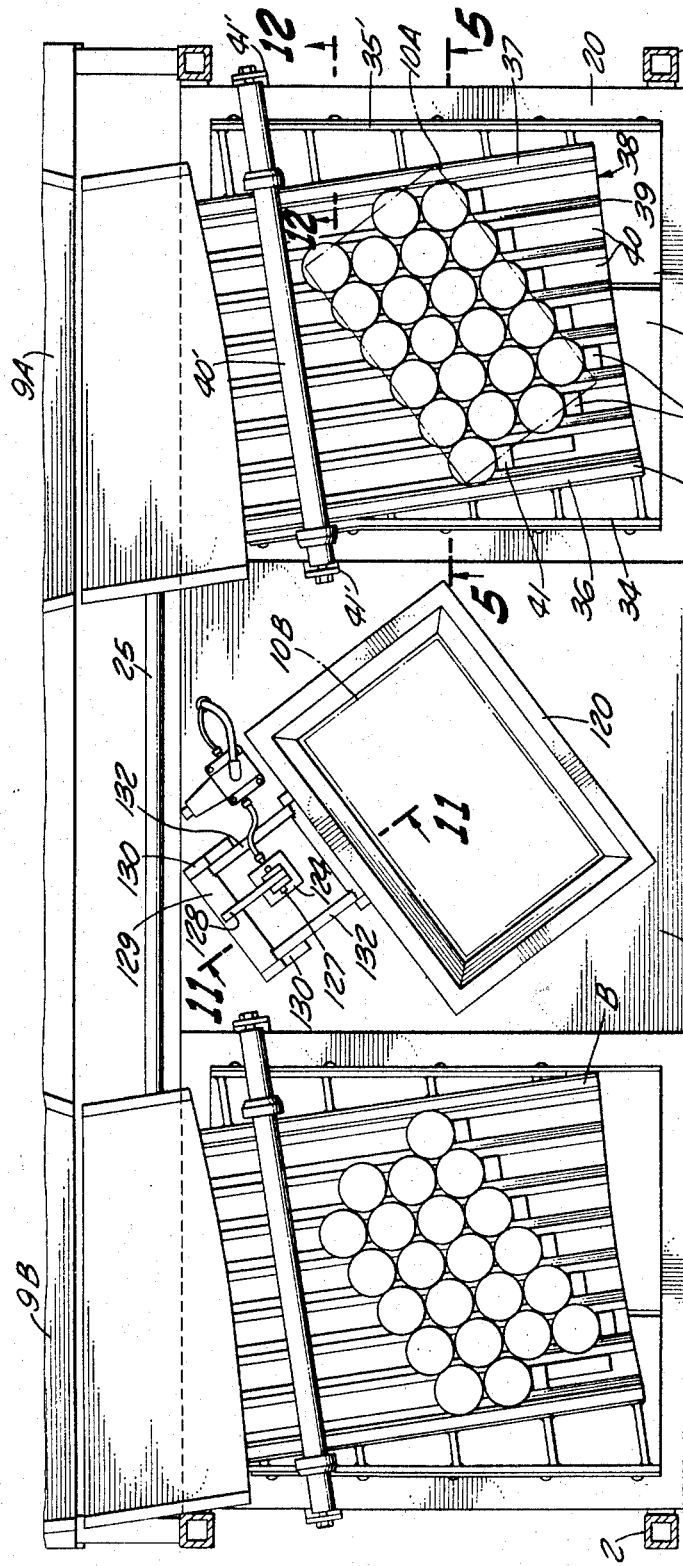

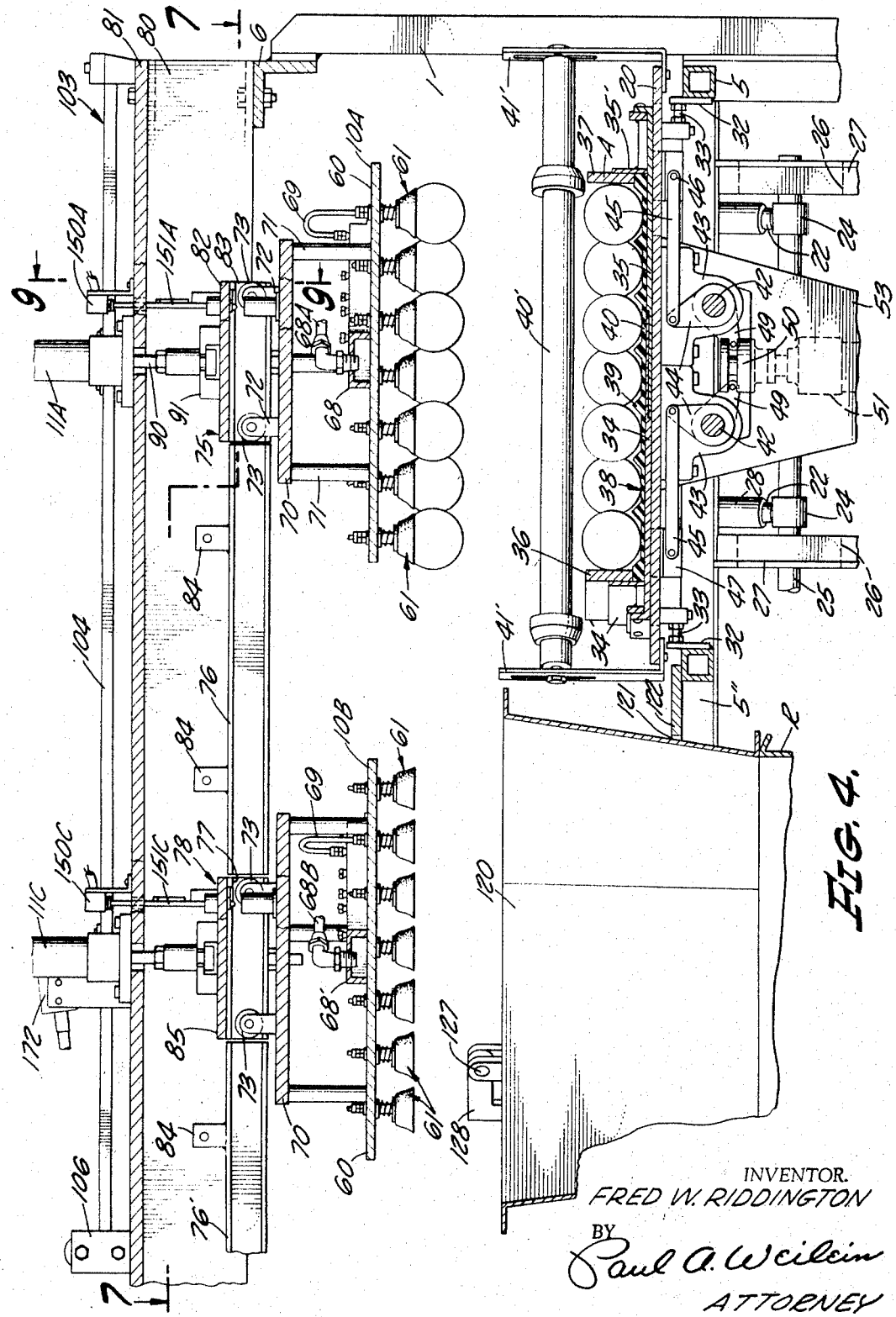

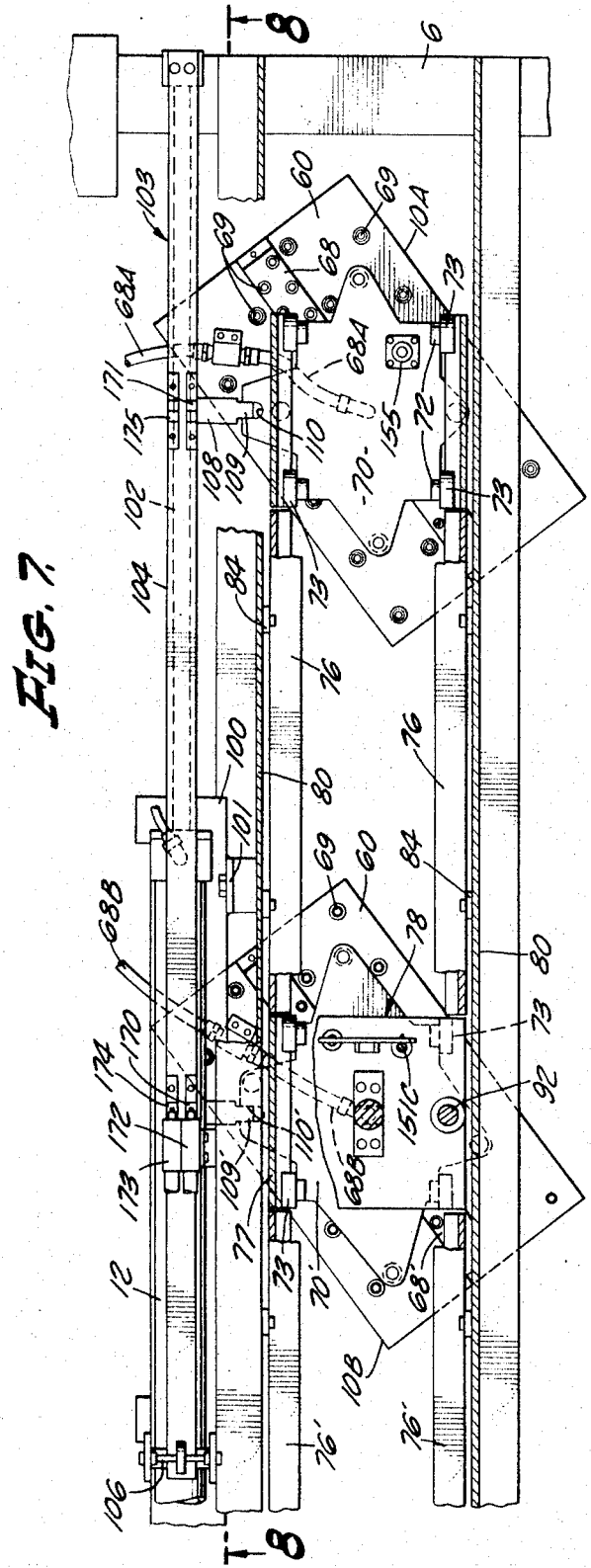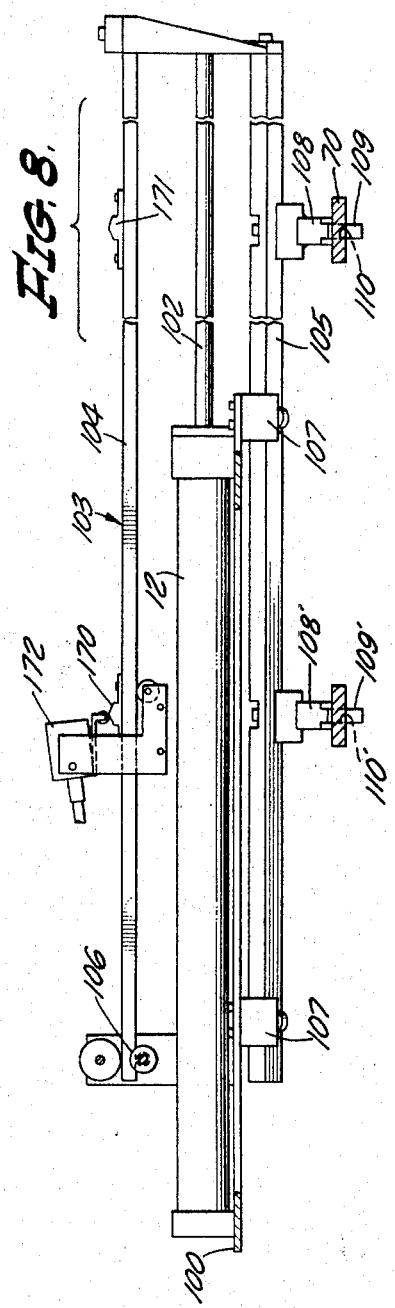

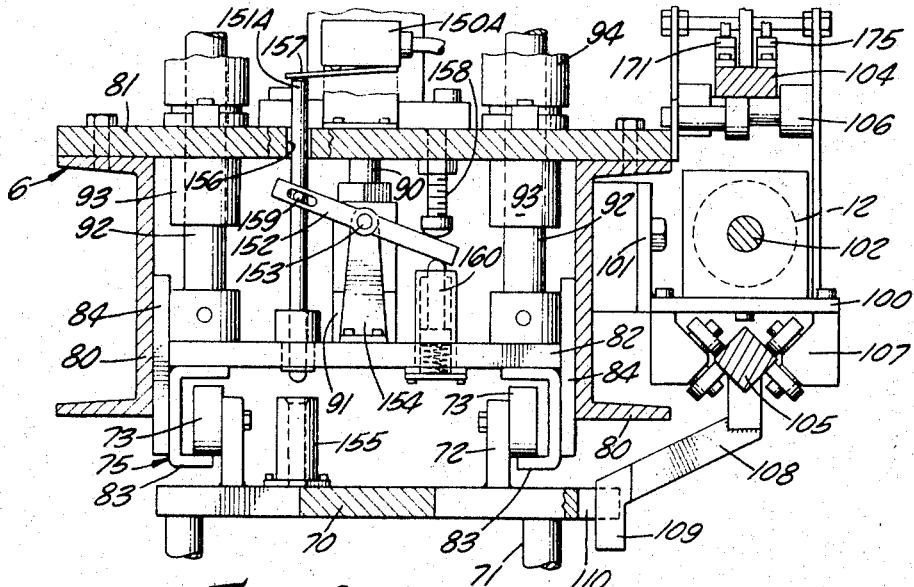
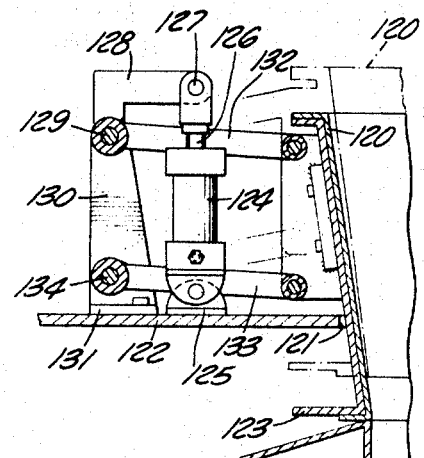
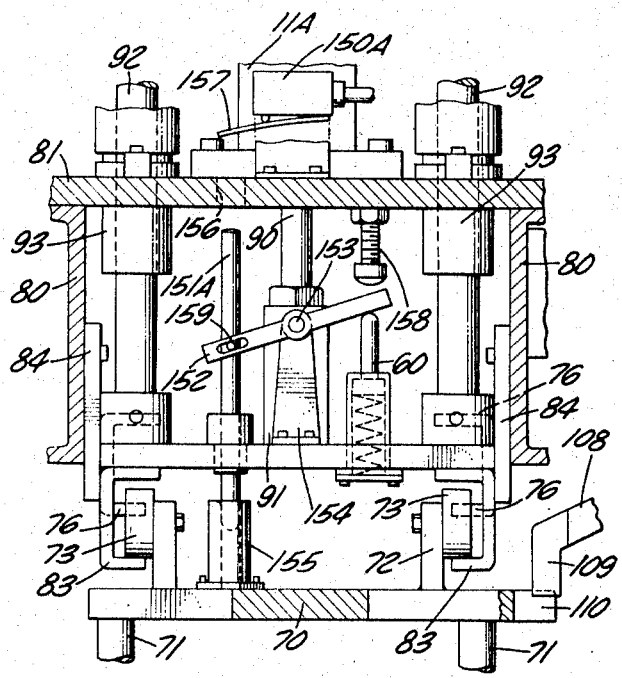

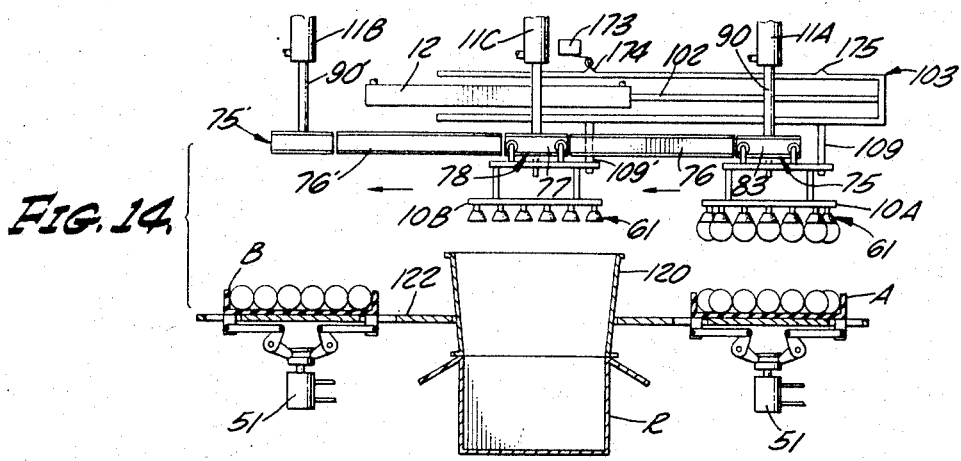
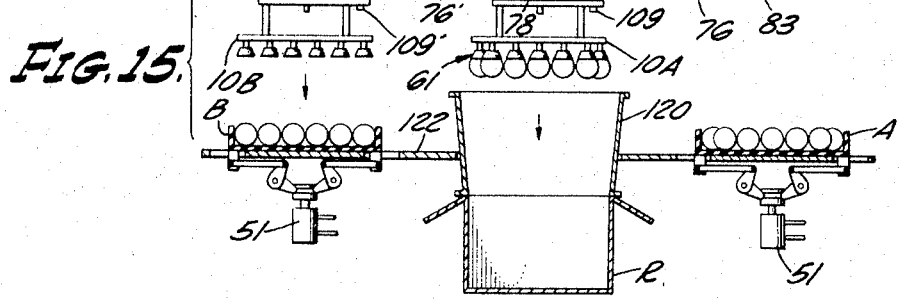
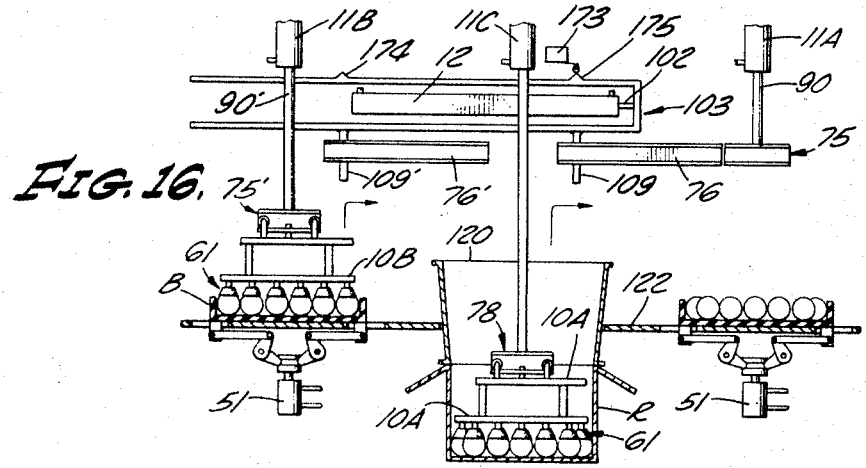

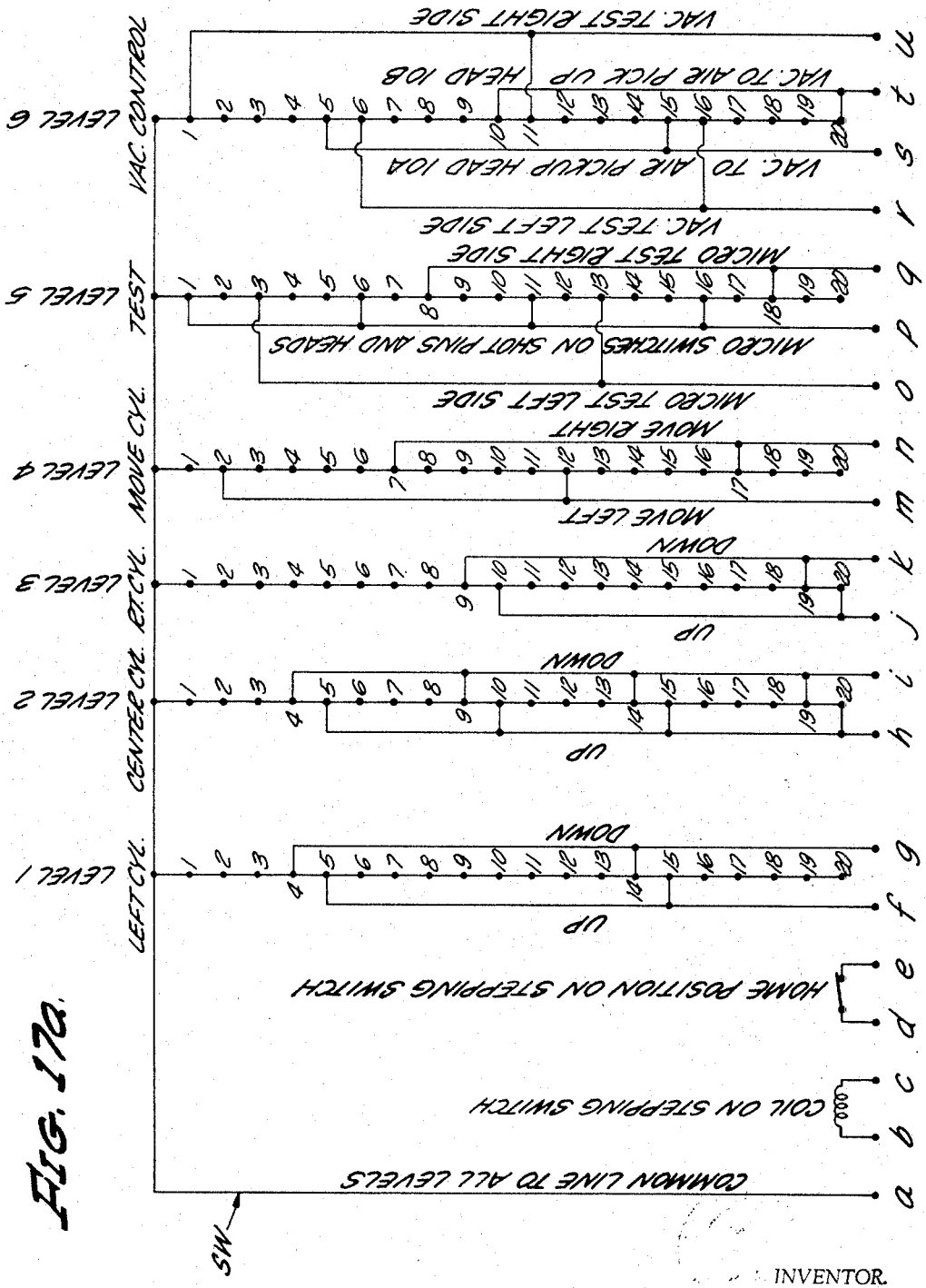

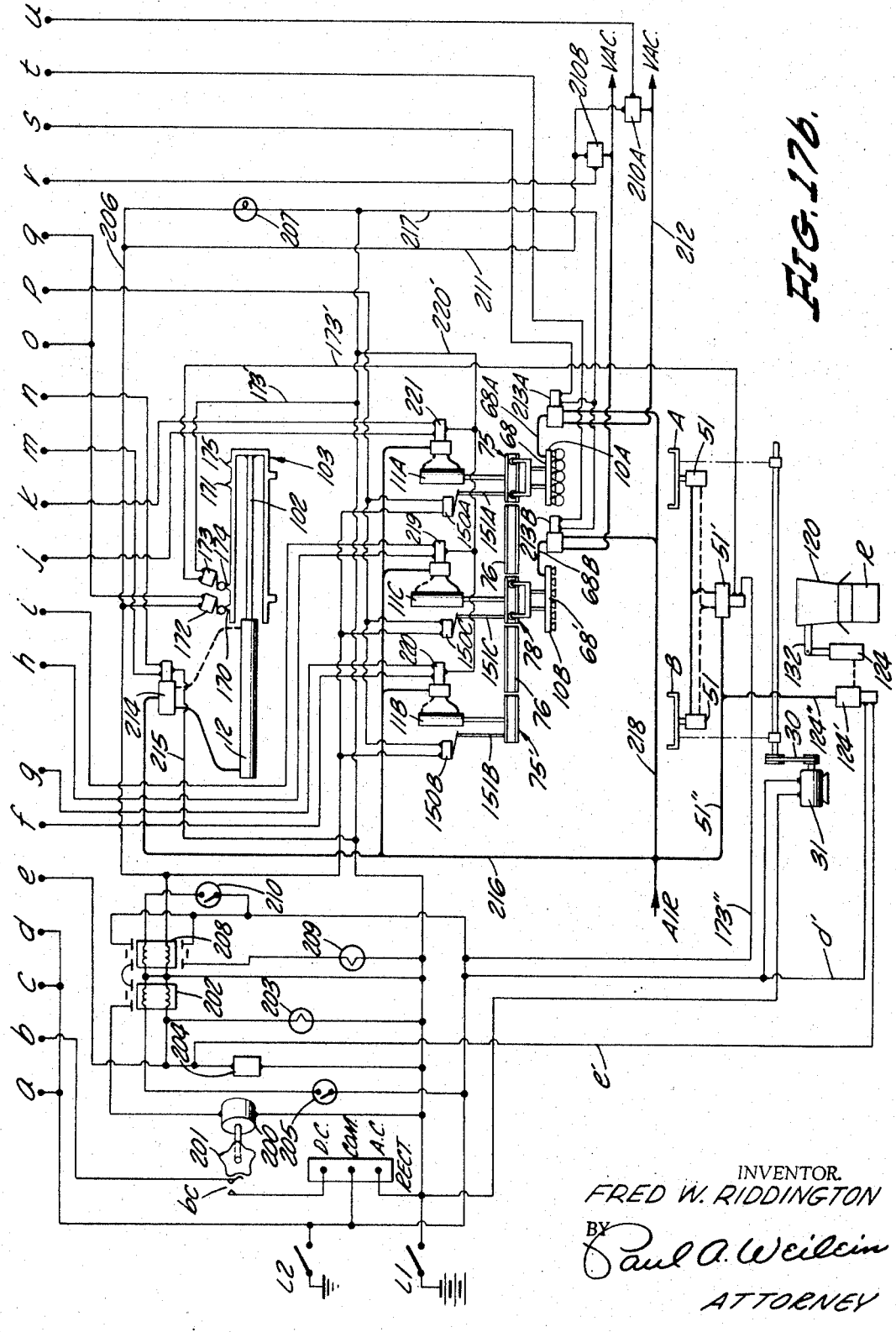

United States Patent Office 3,453,802
Patented July 8, 1969

3,453,802
APPARATUS FOR AUTOMATICALLY BOXING
LAYERS OF ARTICLES
Fred W. Riddington, Ontario, Calif., assignor to Sunkist Growers, Inc., Los Angeles, Calif., a corporation of California
Filed Mar. 7, 1966, Ser. No. 532,132
Int. Cl. B65b 57/00, 19/32
U.S. Cl. 53—60                                30 Claims

ABSTRACT OF THE DISCLOSURE

Citrus fruit moves by gravity to the ends of spaced first and second chutes which automatically group the fruit into first and second patterns, respectively, for packing into boxes, the two patterns being complementary to cause the alternate patterns to nest together in the boxes. First and second pickup means having corresponding patterns of vacuum heads move in unison in a cycle wherein the first pickup means engages a group of fruit of the first pattern on the first chute while the second pickup means deposits a group of fruit of the second pattern in the box, then the first pickup means deposits its group of fruit in the box while the second pickup means engages a new group of fruit of the second pattern in the second chute.

---

The present invention relates to apparatus for placing articles in receptacles such as shipping boxes, and more particularly to apparatus whereby a plurality of articles are prearranged on article delivery chutes so as to be transferred from the latter in a prearranged condition or pattern and deposited in a receptacle to the end that the receptacle may be packed with the articles in layers which nest or interfit with one another or in layers in which the articles are placed vertically one on top of the other, as may be desired, but in any event in layers corresponding to the prearranged pattern established on the transfer of the fruit from the chutes.

The present invention is an improvement in the apparatus disclosed in the pending application of Wayne E. Zwiacher et al., Ser. No. 480,021 filed Aug. 16, 1965, for Method of and Apparatus for Boxing Layers of Articles Such as Fruit and the Like, and moreover, the present invention constitutes another apparatus for practicing the method of such pending application.

The present invention involves the provision of apparatus for the placement or arrangement of groups of fruit such as citrus fruit, or other such articles of generally spherical form hereinafter generically termed fruit, on spaced feed chutes adapted to feed fruit in rows to positions on the respective chutes forming groups of fruit which are so correlated to one another as to correspond to the desired fruit correlation when a layer of fruit is placed in the receptacle, and then automatically transferring successive alternate groups or layers of fruit from the feed chutes to a receptacle therefor, the apparatus being so constructed and controlled as to successively effect the predisposition of the rows of fruit in the desired patterns and to automatically remove from the chutes the first patterns and place the same in a receptacle in successive layers until the filling of the receptacle is completed, at which a cycle of the apparatus is complete and thereafter a new receptacle may be placed in position to receive the successive fruit layers and the apparatus may be recycled.

In accomplishing the foregoing, it is an object of the invention to provide apparatus wherein fruit is fed into a pair of spaced chutes and a pair of pickup heads supported above the chutes are alternately shifted transversely of the chutes and reciprocated vertically so that one pickup head picks up a group of fruit from one chute while the other pickup head deposits previously picked up fruit in a receptacle, and wherein means are provided for effecting the automatic control of the shifting of the heads both transversely of the chutes and vertically.

Still another object is to provide control means whereby the operation of the apparatus is foolproof in the sense that any malfunction of the machine will be sensed and the machine will be halted so as to prevent either damage to the machine or damage to fruit or the packing of incomplete layers of fruit in the receptacle.

In accomplishing the next preceding objective the apparatus hereof involves a control system which causes the repetition of five functions to provide for the packaging of repetitive layers of fruit, the system comprising: (1) means for effecting a test to determine that both pickup heads are in the up position at the outset of a boxing cycle and, assuming that one of the pickup heads has been filled with fruit, for testing to determine that such head is filled; (2) movement of the heads transversely; (3) a test to determine that the heads have moved to the extreme transverse position; (4) movement of the pair of cylinders downwardly; and (5) movement of the pair of cylinders back to the upper position. In the next repetitive cycle it will be understood that the same five functions will be repeated and that if the functions are repeated four times, there will be four layers of fruit placed in the receptacle. If the function is repeated five times, five layers of fruit will be placed in the receptacle. In addition, the system involves means for shutting off the machine following the placement of the last layer of fruit in the receptacle.

Other objects and advantages of the invention will be hereinafter described or will become apparent to those skilled in the art, and the novel features of the invention will be defined in the appended claims.

In the accompanying drawings:

FIG. 2 is an end elevation of the apparatus of FIG. 1 on an enlarged scale;

FIG. 3 is a substantially horizontal sectional view as taken on the line 3—3 of FIG. 2;

FIG. 4 is a fragmentary view in section as taken on the line 4—4 of FIG. 2;

FIG. 7 is a sectional view as taken on the line 7—7 of FIG. 4;

FIG. 8 is a sectional view as taken on the line 8—8 of FIG. 7;

FIG. 9 is a fragmentary detail view in section as taken on the line 9—9 of FIG. 4;

FIG. 10 is a view corresponding to FIG. 9 but illustrating the parts initially moved in the direction of a downward stroke of the right hand pick up cycle;

FIG. 11 is an enlarged fragmentary detail view in section as taken on the line 11—11 of FIG. 3;

FIG. 12 is a fragmentary detail view in section as taken on the line 12—12 of FIG. 3;

FIG. 13 is an enlarged fragmentary detail view in section of one of the pickup elements;

FIG. 14 is a diagrammatic view illustrating the apparatus in one fruit pick up stage of operation;

FIG. 15 is a diagrammatic view illustrating the apparatus of FIG. 14 shifted to an intermediate fruit pick up and discharge position;

FIG. 16 is a view corresponding to FIGS. 14 and 15, but illustrating the shifting of the pickup means to the second fruit pick up and discharge positions;

FIG. 17a is a schematic diagram illustrating stepping switch functions which control the apparatus of FIGS. 1–16; and FIG. 17b constitutes a downward continuation of the diagram of FIG. 17a illustrating the control elements which respond to operation of the stepping switch of FIG. 17a.

Like reference characters in the several views of the drawings and in the following description designate corresponding parts.

GENERAL DESCRIPTION

Figure 1:
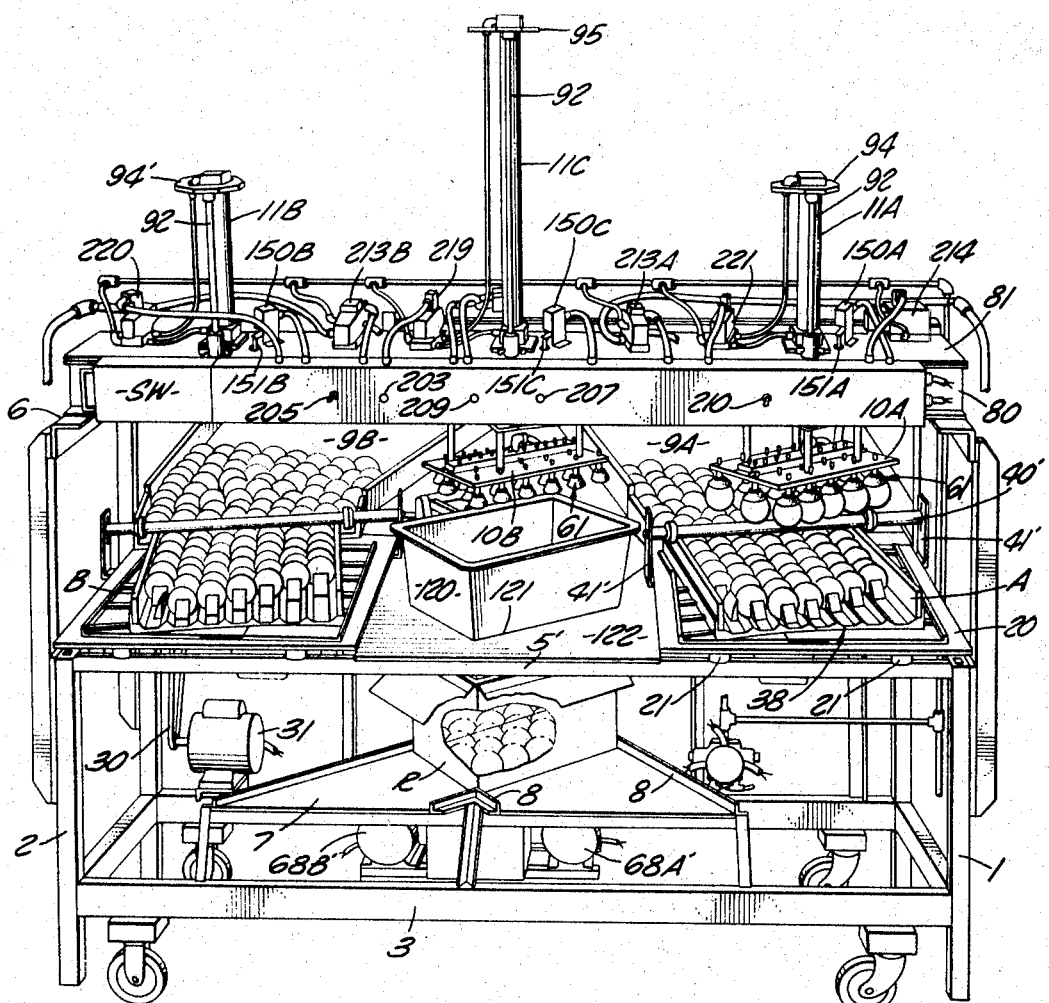
FIG. 1 is a front elevational view of a fruit boxing apparatus made in accordance with the invention.

Referring first to FIGS. 1 and 2, a machine embodying the features of the present invention will be seen to generally comprise a supporting framework including end frames 1 and 2 which will respectively be hereinafter referred to as the right and left hand ends of the machine as viewed frontally in FIG. 1. Interconnecting the end frames 1 and 2 is a base frame 3 on which may be mounted suitable casters so as to enable portability of the apparatus. Intermediate the end frames 1 and 2 are elongated support means 5 disposed at a slight forward inclination and at the top of the end frames is elongated support means 6 also disposed at a slight inclination corresponding to the inclination of the support means 5, the inclination of the intermediate and top support means 5 and 6 being for a purpose which will hereinafter more fully appear.

Mounted upon the base frame 3 is a box support 7 in the form of a triangular table also mounted on an inclination corresponding to the inclination of support means 5 and 6 and having guide walls 8 defining a channel through which a box or receptacle R may be moved to a desired angularly disposed location beneath the intermediate support means 5, such position being a position at which the box will receive layers of fruit.

Mounted upon the support means 5 adjacent the end frames 1 and 2 is a right hand pattern forming chute means A and a left hand pattern forming chute means B which are adapted to arrange fruit or other generally spherical articles in rows with the fruit of adjacent rows disposed in a precise pattern corresponding to the pattern of a layer of fruit to be placed in the receptacle R. Fruit is fed to the rows from supply chute means respectively designated 9A and 9B, and the fruit will gravitationally travel down the inclined chutes A and B.

Carried by the upper support means 6 is a pair of pickup heads respectively designated 10A and 10B adapted to be reciprocated to effect engagement of the heads with the fruit in the chutes A and B or deposit of the fruit supported by the respective head in the receptacle R, depending upon whether the vertical reciprocation of the heads occurs when head 10A is in the right hand position shown in FIG. 1 and the head 10B is in the center position shown in FIG. 1, or whether the heads have been moved on the support means 6 to a left hand position at which head 10B is disposed above chute B and head 10A is disposed above the receptacle R.

Means are provided for effecting such vertical reciprocation of the heads 10A and 10B and such means is shown as mounted upon the support means 6 and including an air operated actuator cylinder 11A at the right hand side of the apparatus, an air actuated cylinder 11B at the left hand end of the apparatus, and an intermediate air actuated cylinder 11C at the center of the apparatus. It is notable at this point that as will hereinafter more specifically appear, the heads 10A and 10B are each operable by the center cylinder 11C when in the center position, but such heads are respectively operable by their cylinders 11A and 11B when in the right hand and left hand positions.

Referring now to FIGS. 7 and 8, it will be noted that the apparatus also includes a horizontally extended air operated cylinder 12 which, in a manner to be hereinafter more fully described, will effect the movement of the heads simultaneously between the respective right and left hand positions just described above.

A source of air under pressure may be provided in any suitable manner for the operation of the various actuator cylinders described above. Suitable supply conduits which will be hereinafter more particularly described in connection with FIG. 17b, may be employed to conduct air from such a source to the various air actuator devices.

PATTERN FORMING CHUTES

Referring now to FIGS. 3–6, the chutes generally referred to above as pattern forming chute means A and B will be described in greater detail. Chute A comprises a base plate 20 mounted upon longitudinally extended front and rear support bars 5' and 5" constituting a part of the support means 5. At the lower end of the plate 20, that is on the end which overlies support bar 5', it rests upon a resilient support means which may be in the form of a pair of suitable rubber blocks 21. At the rear of the plate 20 adjacent support bar 5" it is supported upon means for vertically agitating plate 20, including a pair of vertically reciprocable pusher rods 22 engaged at their upper ends with a member 23 carried by plate 20 and engaged at their lower ends with an eccentric 24 mounted upon a shaft 25. The shaft 25 is revolvable in bearing blocks 26 carried by uprights 27 at the rear of the supporting frame structure and the pusher rods 22 are reciprocable in sleeves 28 carried by the support bar 5". Shaft 25 is driven by a pulley 29 mounted on the shaft and driven by a belt 30 which in turn is driven by a motor 31 mounted on the base frame 3.

It will now be recognized that the plate 20 will be agitated responsive to actuation of pusher rods 22 and, therefore, the plate 20 is adapted to be centralized between rails 32 carried by the intermediate frame means 5, the plate 20 being provided with adjustable screw members 33 slidably engageable with the rails 32.

Figure 5:
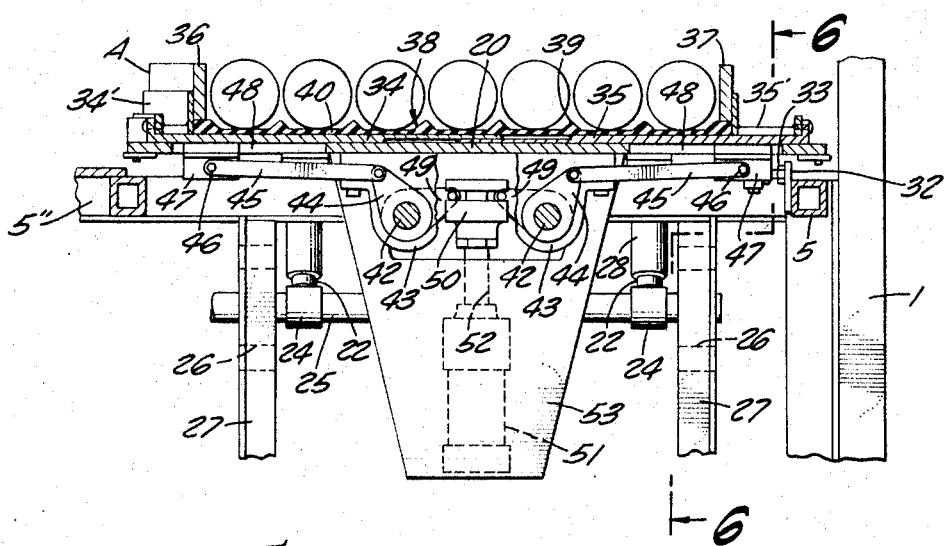
FIG. 5 is a fragmentary detail view in section as taken on the line 5—5 of FIG. 3.

Disposed upon the plate 20 is a pair of transversely slidable plates 34 and 35 which overlap medially of the plate 20, as seen in FIGS. 4 and 5. At the outer edges of the sliding plates 34 and 35, spacer elements 34' and 35' are provided, the spacer elements being generally triangular so as to support side walls 36 and 37 of the chute A in parallel relation and at a slight angle to the end frame 1. Disposed above the relatively slidable plates 34 and 35 and resting on the latter is a rubber or other suitable resilient material pad 38 for the chute, the pad having longitudinally extended dividing ridges 39 providing therebetween paths 40 whereby to confine the fruit fed to the chute A from the supply chute 9A to parallel rows. In addition, the pad 38 is provided with upstanding stops 41 so as to limit downward travel of the respective rows of fruit. As seen in FIGS. 1 and 3, for example, the stops 41 are so arranged that as the fruit travels in paths 40 between ridges 39, the rows of fruit will be arrested in a particular pattern which is adapted to be picked up by the pickup head A in a manner hereinafter to be described. This pattern, as seen in FIG. 3, comprises rows of fruit which nest with one another on the chute pad 38 and means are provided for compressing the rows of fruit between the side walls 36 and 37 into the precise layer pattern to be placed into the receptacle R.

Figure 6:
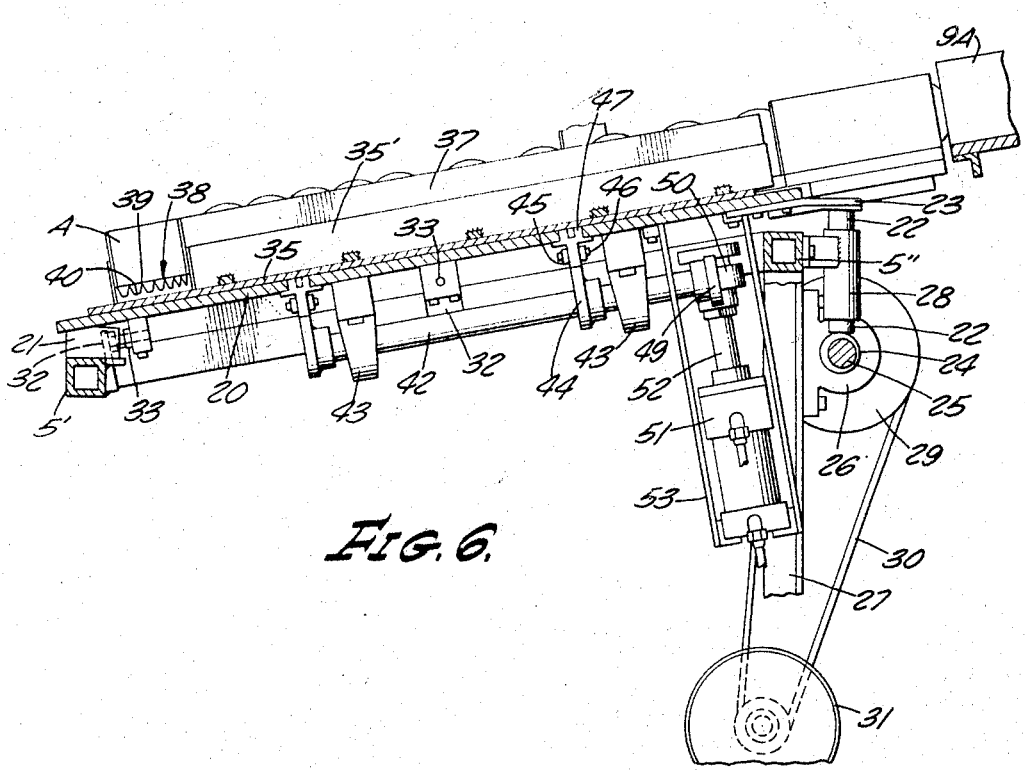
FIG. 6 is a detail view in section as taken on the line 6—6 of FIG. 5.

This means for compressing the rows of fruit, as best seen in FIGS. 4, 5, and 6, is adapted to effect movement of the side walls 36 and 37 toward and away from one another, the side walls being shown in FIG. 4 as in a position compressing the rows of fruit transversely of the chute pad, and such side walls in FIG. 5 being shown more widely spaced. The means for effecting such movement of the side walls comprises a pair of spaced rock shafts 42 supported in bearings 43 carried beneath the base plate 20 of the chute A. Each rock shaft 42 has thereon a crank arm 44 to the outer end of which is connected a link 45, and at its outer extremity each link 45 is connected as at 46 to a block 47 connected to one of the slidable plates 34 and 35 and extending through slots 48 in the plate 20. Each rock shaft 42 has another crank arm 49, the free end of which is connected to a reciprocable head 50. This head 50 is adapted for reciprocation by an air cylinder 51 having a rod 52 on which the head 50 is mounted. Cylinder 51 is mounted on the lower side of plate 20 as by supporting bracket assembly 53.

It will be noted that reciprocation of head 50 will effect oscillation of rock shafts 42 and consequential reciprocation of plates 34 and 35 toward and away from one another and that when the side walls 36 and 37 are moved from the position shown in FIG. 5 to the position shown in FIG. 4, the fruit lying between the side walls will be compressed or compacted so that each of the fruit in the adjacent rows 40 will nest with the fruit of the other rows and will be precisely located so as to be picked up by the head 10A.

Disposed above the chute A is a wiper bar or rod 40' which is adjustably supported on the support means 5 by brackets 41' so as to prevent the piling up of fruit between the rows disposed in paths 40.

At the left hand side of the apparatus the chute B is constructed the same as the chute A including the provision of similar means for effecting vertical agitation of the chute as well as movement of the side walls toward and away from one another. Therefore, it is believed unnecessary to describe in detail the identical chute structure.

FRUIT PICKUP HEADS

The pickup heads 10A and 10B except in respect of the fruit pattern to be picked up thereby, are essentially identical. The fruit pickup head 10A, as best seen in FIGS. 1, 2, and 4, comprises a rectangular plate 60 having supported therebeneath a plurality of pickup elements 61 (the details of which are best seen in FIG. 13). Each pickup element is supported in a tapered opening 62 in the plate 60 and includes a stem 63 extended through the opening, a retainer washer 64 engaging the top of the plate, and a spring loaded washer 65 engaging the bottom of the plate 60 so that the stem is resiliently supported for slight angular deflection. Carried by the stem 63 is a cup 66 and a passage 67 is provided through the stem and leads into the cup 66 so that the cup may be evacuated when engaged with the fruit whereby to hold the fruit in the cup and whereby air from tank T may be injected into the cup to expel the fruit therefrom.

The pickup elements 61 are arranged in rows beneath the plate 60 in a pattern corresponding to the pattern of fruit to be formed on the chute A so that when such pattern is formed on the chute A and when the head 10A is lowered to cause engagement of the cups with the fruit, each cup will engage a fruit in the desired pattern. Such pickup head construction, combined with a pattern forming chute, is the subject of the pending Zwiacher et al. pending application identified above.

Extended along the plate 60 is a manifold 68 to which conduits 69 connect the respective pickup elements so that upon evacuation of the manifold 68 or upon the application of air under pressure thereto, all of the pickup elements will be simultaneously evacuated or pressurized.

The difference between pickup head 10A and pickup head 10B in the illustrative embodiment will be understood to involve the use of pickup elements 61 arranged differently on the respective heads. By way of example, reference is made to FIG. 3 wherein it will be noted that there is shown on the chute A a pattern of fruit to be picked up by the pickup head 10A which is diagrammatically shown in broken lines. This pattern includes four rows of fruit to be placed in the receptacle, such rows being made up by fruit taken from each of the chute paths 40 and the pattern extending diagonally of the chute A. This exemplary pattern includes two rows of five fruit and two rows of six fruit arranged alternately, the lowermost row on the chute consisting of five fruit.

On the other hand, the pattern of fruit shown on chute B while also consisting of two rows of five fruit and two rows of six fruit, has the lowermost row on the chute B consisting of six fruit so that the just mentioned row will nest with the row of five fruit of the pattern on chute A when the respective patterns are progressively picked up and transferred to the receptacle, layer B upon layer A.

It will be understood further at this point that the patterns of fruit shown are merely illustrative and the articles to be picked up and transferred to a receptacle may comprise rows of various numbers and the patterns may either be arranged so as to nest one in the other or so as to be stacked in columns, that is, by the alternate packing of identical patterns.

The plate 60 of pickup head 10A is supported upon a carriage including a support 70 connected by member 71 to the plate 60 and having thereon spaced pairs of ears 72 having rollers 73 thereon. These rollers 73 are adapted to engage rails of a right hand vertically movable carriage support 75 as well as stationary rails 76 and rails 77 of a center vertically movable carriage support 78, all of which will be hereinafter described.

The pickup head 10B like pickup head 10A has similar pickup elements 61, manifold 68, and interconnecting conduits 69 which need not be further described and, in addition, the pickup head 10B has rollers 73 mounted on a support 70 for the plate 60. These rollers 73 of head 10B are engageable with the aforementioned rails 77 of the center vertically movable carriage support 78 as well as left hand stationary rails 76' which extend between the center carriage support 78 and a left hand vertically movable carriage support 75'.

The vacuum pickup elements or cups 66 and more particularly the pickup manifolds 68 and 68' are adapted to be connected by suitable flexible conduits 68A and 68B to vacuum pumps 68A' and 68B' which may be mounted conveniently beneath table 7, as shown in FIG. 1.

PICKUP HEAD CARRIAGE SUPPORTS AND MOVING MECHANISMS

The pickup head carriage supporting means and moving mechanisms which are best illustrated in FIGS. 1, 2, 4, and 7–10, are provided for supporting the pickup heads 10A and 10B as they are respectively moved downwardly to pick up fruit from the chutes A and B or deposit such picked up fruit in the receptacle R and as the head carriages are being moved from the right hand position to the left hand position, as previously referred to, as well as to effect such movement between the right and left hand positions.

Such carriage supporting means and moving means are incorporated in the support means 6 at the top of the end frames 1 and 2. The support means 6 more particularly comprises a pair of back-to-back structural members or channel irons 80 and an overlying interconnected top plate 81. Referring for the moment to FIGS. 2 and 4, it will be noted that the above mentioned vertically movable carriage support 75 at the right hand side of the apparatus comprises a horizontal plate 82 from which depend a pair of rails 83 formed by opposing channel members adapted to receive the rollers 73 carried by support 70 when the carriage support is in the upper position. The aforementioned rails 76 are mounted on the opposing channel members 80 as by mounting brackets 84 with the rails 76 adapted to receive the rollers 73 as the carriage moves to the left.

Likewise, the center vertically movable carriage support 78 comprises a horizontal plate 85 on which the rails 77 are supported so that when the center carriage support 78 is in the upper position shown in FIG. 4 the rails 77 are aligned with rails 76 as well as with the rails 76'. The latter lead to the left hand end of the apparatus and the left hand vertically movable carriage support 75' which in its upper position will have its rails aligned with the stationary rail 76' (see FIG. 14 for example). The details of the left hand carriage support 75' are the same as the details of the carriage support 75 and it is believed unnecessary to show or describe the carriage support 75' in greater detail.

The means for vertically moving the pickup head 10A comprises the actuator cylinder 11A previously referred to, the working rod 90 of which projects through the upper support plate 81 and is connected to a mounting bracket 91 carried by the plate 82 of the carriage support 75. Projection of the working rod 90 from cylinder 11A will cause downward movement of carriage support 75 to cause downward movement of the pickup head 10A. In a similar manner which need not be shown and described in detail, the left hand actuator cylinder 11B has its working rod 90' (see FIGS. 14–16) connected to the left hand vertically movable carriage support 75' so as to effect movement of the latter downwardly and upwardly, as will be more fully described hereinafter.

In order to stabilize the pickup heads 10A and 10B as they are being moved vertically, it is preferred that each of the carriage supports 75, 75', and 78 be connected to a pair of stabilizing rods 92 which extend through bushings 93 mounted in the upper support plate 81. The stabilizer rods 92 of carriage support 75 extend upwardly and are connected to a plate 94 slidably carried by the cylinder 11A for vertical movement (see FIGS. 1 and 2), while the stabilizer rods 92 of carriage support 75' are connected to a plate 94' slidable on cylinder 11B, and the stabilizer rods 92 for the center carriage support 78 are connected to plate 95 slidably carried by the cylinder 11C.

Means for effecting translation of the pickup heads 11A and 11B from the right hand and center positions, respectively, as shown in FIG. 4 to a center and left hand position, respectively, as will be hereinafter described, comprises, as best seen in FIGS. 7–10, the previously mentioned air cylinder 12 which is carried by a support 100, the latter being secured as at 101 to the upper support means 6 and more particularly to the rearward channel member 80 (see FIG. 9). This cylinder 12 has a working rod 102 projecting therefrom and connected to an elongated yoke-like member 103 having an upper arm 104 and a lower arm 105 extending horizontally above and below the cylinder 12. The upper arm 104 is slidably disposed in a roller support 106 adjacent the rear end of the cylinder 12, while the lower arm 105 is slidably extended through roller supports 107.

Means are provided for establishing a separable drive connection between the lower yoke arm 105 and the pickup head supports 70 and 71' respectively of the pickup heads 10A and 10B. Referring to FIGS. 9 and 10, it will be noted in this connection that disposed beneath the yoke arm 105 and rigidly connected thereto is an offset drive member 108 having a downwardly extended lug 109 adapted to engage in a notch 110 in plate 70. Likewise, another arm 108' similar to arm 108 is provided beneath the lower yoke arm 105 and has a drive lug 109' engageable in either the notch 110 of the support plate 70 of head 10A or in a corresponding notch 110' in the support plate 70' of head 10B, depending upon whether the heads 10A and 10B are in the right hand and center position, respectively, or in the center position, respectively, or in the center position and left hand position, respectively.

It will now be understood that extension and retraction of the rod 102 of cylinder 12 will effect such translation of the yoke 103 and consequently heads 10A and 10B between such positions, provided the heads are moved upwardly to effect engagement of the drive lugs 109 and 109' in the notches 110 and 110' just referred to above. It will also be understood that the interconnection between the lugs 109 and 110 and 109' and 110' is one which enables downward movement of the heads 10A and 10B and the drive connection will be re-established upon upward movement of the heads.

BOXING GUIDE

In order to assure the placement of successive layers of fruit in the box or receptacle R without damage to the fruit and particularly in the event that the pattern of fruit when supported in a pickup head spans a distance greater than either the longitudinal or transverse distance between the end and side walls of the receptacle, guide means are provided for guiding the fruit pattern into the open upper end of the receptacle as the respective heads move downwardly into the receptacle. In the illustrative embodiment such guide means includes a rectangular guide 120 the opposing side walls of which diverge slightly downwardly. This guide 120 extends through an opening 121 in a table 122 disposed upon the intermediate support rails 5' between chutes A and B. At its lower extremity the rectangular guide 120 has an outstanding flange 123 and it will be noted upon reference to FIG. 11 that the opening at the lower end of the guide substantially corresponds to the opening at the top of the receptacle R.

Means are provided for effecting vertical movement of the guide 120 from the full line position shown in FIG. 11 with the lower end of the guide engaging the top of the receptacle, to the upwardly moved broken line position shown in FIG. 11 to enable ease of removal of a packed receptacle and insertion of an empty receptacle. In the illustrative embodiment such means includes an air cylinder 124 mounted at 125 on the table 122. The cylinder 124 has a rod 126 connected at 127 to a crank arm 128 mounted for rotation on a shaft 129. Shaft 129 is mounted in a suitable supporting bracket 130 which is also mounted at 131 on the table 122. Crank arm 128 will cause angular movement of a lever 132 upon actuation of the air cylinder to effect the above noted movement of the guide 120. In addition, extended between the supporting bracket 130 and the guide 120 is a stabilizing link 133 mounted on a pivot 134 carried by bracket 130 and connected at its other end to the guide 120.

OPERATION

The operation of the apparatus as thus far described will be understood with greater particularity upon reference to FIGS. 14–16.

As shown in FIG. 14, pickup head 10A is in the right hand position, pickup head 10b is in the center position, and head 10a contains fruit in the pickup cups. This is the condition of these components following the packing of one receptacle and the fruit in pickup head 10A will become the first layer in the receptacle R as shown in these views. Retraction of the rod 102 of cylinder 12 will move the yoke 103 to the left, and drive arms 109 and 109' will cause corresponding movement of the heads 10A and 10B along rails 76 and 76' to the left until the head 10A is supported by the center carriage support 77 and the head 10B is supported by the left hand carriage support 75' as shown in FIG. 15.

As will be more fully described hereinafter, movement of the yoke 103 to the left will cause closure of microswitch 174 by a lug 175 which will effect operation of cylinder 51 with consequent movement of the side walls of chute B toward one another from the positions shown in FIG. 14 to the positions shown in FIG. 15, whereby to compact or compress the fruit in chute B into a precise pattern to be picked up by head 10B. At this time it is desired that the heads be moved downwardly from the position shown in FIG. 15 to the position shown in FIG. 16 so that the fruit supported by head 10A will be deposited in the receptacle while head 10B picks up the fruit off of chute B. The cycle will then be reversed in the sense that the pickup head 10A will be moved back to the position of FIG. 15, as will the pickup head 10B, but the latter will contain a layer of fruit to be subsequently deposited in the receptacle following movement of the pickup heads to the right, that is, to the position shown in FIG. 14, and downward movement of the pickup heads, whereby the fruit then contained in pickup head 10B will be deposited in the receptacle and pickup head 10A will pick up from chute A what will be the third layer of fruit in the receptacle. It will also be noted that movement of the yoke 103 to the right will cause lug 174 to close microswitch 173 so as to compress the fruit on chute A into the desired precise pattern. During translation of the yoke 103 between the right and left extremes, both chutes A and B will have their side walls expanded to allow free movement of the fruit therebetween (see FIG. 5). These operations will continue until the receptacle is full.

CONTROL MEANS

Various control means are provided not only to cause the sequential actuation of the apparatus as just described, but also so as to prevent certain of the sequential steps in the event of a malfunction. In this connection, control means are provided whereby when the pickup heads are in the positions shown in FIGS. 14 and 15, the apparatus will be halted unless the heads are in the full up position so that translation of the heads to the left or right can only occur under the desired circumstances. In addition, with the heads in the position shown in FIG. 14, the apparatus will be shut off in the event that one or more of the pickup cups does not have a fruit retained therein by vacuum, but if the heads are fully up and the vacuum pressure is adequate, then the apparatus will be operated to cause movement of the heads to the left at which location the apparatus will be shut off in the event that the heads should not move fully to the left. If the heads have moved completely to the left, then the left hand cylinder 11B will be operated as will the center cylinder 11C so as to lower the heads as shown in FIG. 16. Thereafter, the heads will be elevated, but the apparatus will be shut off unless the heads are in the full up position and the pickup head 10B is full of fruit.

In addition to the foregoing, it is desirable that following the completion of the desired repetitions of the above five steps, the apparatus will be shut off to enable the removal of the fully packed receptacle and the placement of an empty receptacle into position to receive subsequent layers of fruit.

In connection with assuring that the heads are in the the full up position in either the right or the left hand position, microswitches 150A, 150B, and 150C are provided, and as shown in FIG. 1, these switches are mounted upon the upper support means 6 and more particularly on the top plate 81 thereof. The mechanisms for operating the respective microswitches 150A, 150B, and 150C are representatively shown to best advantage in FIGS. 9 and 10 in which the microswitch 150A is shown as being operable by a shot pin 151A. This shot pin is supported by a lever 152 which is pivoted at 153 upon a bracket 154 which is in turn mounted upon the upper plate 82 of the vertically movable carriage support 75. At its lower end the shot pin 151A extends through the plate 82 in alignment with a socket member 155 mounted on the support member 70 of head 10A. At its upper end the shot pin 151A is aligned with an opening 156 in the top plate 81 of the upper support means 6, and it will be observed that microswitch 150A has an operating arm 157 overlying the opening 156 so as to be engaged by the shot pin 151A when the carriage 75 is in the uppermost position.

Means are provided for operating the shot pin 151A to move it upwardly to actuate the switch arm 157 responsive to completion of the elevation of the carriage support 75. Such means includes an adjustable stop 158 disposed beneath the top plate 81 of support means 6 and engageable with one end of the lever 152, the other end of the lever being conducted to the shot pin 151A as by a lost motion connection at 159. In addition, a spring loaded plunger 160 is provided to forcibly move the lever 152 in a direction to lower the shot pin 151A as the carriage support 75 is moved downwardly, and such lowering of the shot pin will cause its lower end to project into the socket member 155. Thus, so long as the shot pin has its ends both in the socket member 155 and in the opening 156 in the stationary support, the carriage supporting head 10A may not be moved horizontally relative to the vertically movable carriage support.

As seen in FIG. 10, the shot pin is engaged in the socket member 155 and will be moved upwardly therefrom as the carriage support 75 moves progressively from the full line position to the broken line position represented by the rails 83 and as the lever 152 is moved into engagement with the stop 158. The adjustability of the stop 158 enables the fine adjustment of the location at which the shot pin 151A will actuate microswitch 150A. In this manner the apparatus, as will hereinafter more fully appear, will be incapable of moving the head 10A off of the vertically movable support 75 except when the rails 83 are in reasonable alignment with the rails 76.

It will be apparent that similar shot pin and shot pin operating mechanisms will be provided on the vertically movable carriage support 75' and on the vertically movable carriage support 78 for respectively operating microswitches 150B and 150C. However, it is believed unnecessary to show or describe such similar mechanisms in detail.

As regards the horizontal translation of the heads and with reference to FIGS. 7 and 8, it will be noted that the upper arm 104 of shifting yoke 103 has a pair of spaced lugs 170 and 171 thereon adapted to actuate a microswitch 172 which, in a manner to be hereinafter described, will cause the apparatus to be stopped unless the head carriages have been moved fully to the left or to the right. In order words, in the full right hand position lug 170 actuates microswitch 172, while in the full left hand position lug 171 actuates microswitch 172. Also, as best seen in FIG. 7, there is a second pair of lugs 174 and 175 on the yoke arm 104, which lugs, as previously indicated, are adapted to actuate the microswitch 173 whereby to effect operation of the air cylinder 51 beneath chute A as well as the corresponding cylinder beneath chute B so that at the desired time during the movement of the respective pickup heads 10A and 10B in a direction to engage and pick up the fruit pattern from the respective chutes, the chute side walls will be moved toward one another to compress the rows of fruit on the chutes to a pattern corresponding to the pattern of the pickup elements on the heads. When the microswitch 173 is open, the side walls of chutes A and B will be spread apart to allow free movement of fruit down the chutes.

In addition to the just mentioned controls which all function as a result of movement of the components of the apparatus to and from desired positions, the cycling of the apparatus as well as the operation of the microswitches previously described are under the control of an electropneumatic control system which will now be described.

ELECTROPNEUMATIC CONTROL SYSTEM

The electropneumatic control system, as herein illustrated in FIGS. 17a and 17b, may be advantageously composed of a multiple stage stepping switch SW suitably located on the apparatus as shown in FIG. 1, the stages of which are diagrammatically represented in FIG. 17a and the progressive actuation of which through the twenty representative stages, will control the functioning of the apparatus as previously described. The stepping switch may be caused to progress through its stages by means of an electric motor 200 which drives a cam 201 having thereon a number of lobes representative of the five stages of operation of the apparatus as described above.

In addition, the stepping switch and the system controlled thereby comprises, as shown by the legends in FIG. 17a, six levels of operation, i.e., "LEVEL 1," the control of the left cylinder 11B; "LEVEL 2," control of the center cylinder 11C; "LEVEL 3," control of the right cylinder 11A; "LEVEL 4," control of the translating cylinder 12; "LEVEL 5," control of test elements; and "LEVEL 6,"

control of vacuum and air. These six levels of stepping switch operation involve, as the legends designate, the up and down movement of the cylinders under the control of the first three levels, the left and right movement of the translating cylinder under the control of the fourth level, the testing to determine the full up movement of the heads and full left and right movement thereof at the fifth level, and the vacuum test and the vacuum-air shift at the sixth level.

The cam 201 is adapted to operate a switch bc, that is, each lobe of the cam 201 will cause closure of the switch bc for a period, as may be determined by the cam lobe, as a consequence of which the stepping switch coil will be energized by the conductors b and c as designated at the top of the control system of FIG. 17b, and at the corresponding conductors b and c at the bottom of FIG. 17a. As here shown, the stepping switch is operated by direct current supplied from a rectifier which is connected to an alternating current source L1, and conductor c returns to a common ground which is also connected to all levels of the stepping switch via conductor a.

The stepping switch also includes a "HOME POSITION" which is effectively a switch connected in conductors d and e of FIGS. 17a and 17b which is operated following completion of a boxing cycle, that is, after the operation of the twenty stages of the stepping switch which will hereinafter be described, the home switch will cause de-energization of the motor 200 by opening a holding relay 202 a releasing coil of which is in circuit with the conductor e and ground d when the home position switch is closed. Connected in circuit in conductor e with the releasing coil of the holding relay 202 are an indicator light 203 which will be illuminated each time a box is completed and a counter 204 which will be operated to count the number of boxes packed. In parallel circuit with the counter 204 so as to be energized when the home position switch is closed, is a solenoid valve 124' which will control the supply of air under pressure supplied via a conduit 124" so as to effect actuation of the boxing guide 120. The circuit for energizing the solenoid valve 124' includes a conductor e' and a ground conductor d'. The home position switch may be overridden to commence the packing of a new box by closure of a starter switch 205 which is in circuit with a latching coil of the relay 202 whereby to reclose the relay and thereby complete the circuit to the motor 200 so that the stepping switch may again go through its cycle.

Other aspects of the operation of the control circuit will best be understood with relation to the corresponding operation of the apparatus and, therefore, it will be assumed for the purpose of the following description that the apparatus is as shown in FIG. 14, namely, fruit are supported in the pickup head 10A; the carriages are in the right hand position; an empty box is in position to be filled; and the starting switch 205 will be actuated to cause commencement of a new boxing cycle.

The closure of the switch 205 will cause energization of motor 200 which will close switch bc upon revolution of cam 201 to complete the connection between stage 1 of the stepping switch at level 5 as well as at level 6 with the common line to ground.

Stage 1 at level 5 of the stepping switch is connected to one side of each of the microswitches 150A, 150B, and 150C. The source lead L1 is connected to the other side of said microswitches through a conductor 206 which includes what will be characterized as a malfunction light 207. With the heads 10A and 10B in the right hand position and center position, respectively, as shown in FIG. 17B, if the circuit to stage 1 at level 5 of the stepping switch is completed by either of the microswitches 150A or 150C and conductors p and a, the light 207 will be illuminated, indicating that one of the heads is not in the full up position and at the same time, inasmuch as conductor 206 leads to an unlatching coil of a holding relay 208 which is in series with the relay 202, the motor 200 will be de-energized to prevent further cycling of the apparatus. Unlatching of the relay 208 under these circumstances will complete a circuit including a light 209 which will indicate to the operator that the apparatus has been halted due to a malfunction or due to opening of the relay 208.

On the other hand, at level 6 the conductor u from stage 1 is in circuit with a vacuum switch 210A and a conductor 211 leading from the source line L1. This vacuum switch 210A is connected in a vacuum line 212 leading to a solenoid operated valve 213A which is in a position so that the vacuum line 212 communicates with the manifold 68 of head 10A as previously described. This vacuum switch is of a type which will complete a circuit therethrough in the event that insufficient vacuum pressure exists to maintain the vacuum switch open, and nonexistence of such vacuum pressure would be indicative either that one or more fruit is missing from the pickup head 10A or a vacuum leak otherwise exists. In the event that a vacuum leak exists either due to a missing fruit or otherwise, then even though the heads may be in the full up position, the circuit will be completed between conductors u and a and the source line L1 via conductor 211, thereby causing unlatching of the relay 208 and illumination of the malfunction light 207 to signify that a malfunction has occurred. The apparatus will remain inoperative until the vacuum leak has been corrected so as to cause opening of vacuum switch 210A and the override switch 210 has been closed.

Assuming that with the stepping switch at stage 1, both of the heads are in the full up position and there is no vacuum leak, then the cam 201 will move to the next position closing switch bc to cause movement to stage 2 of the stepping switch, at which the conductor m is connected to the common ground line at level 4. Conductor m leads from a solenoid valve 214 to which leads from source line L1 a conductor 215. Thus, the valve 214 will be actuated to a position so as to cause movement of the yoke 103 to the left by air under pressure supplied through valve 214 by an air conduit 216.

At stage 3 of the stepping switch it will be noted that the conductor o from level 5 will be connected to the common ground line and the conductor o is in circuit with the microswitch 172 connected at its other side to the source line L1. Lug 171 on the yoke 103 will engage and actuate microswitch 172 and hold the same open if the carriages have moved all the way to the left. Otherwise, microswitch 172 will remain closed and the circuit including source line L1, conductor 206, and light 207 will be completed, and the holding relay 208 will be unlatched, as previously described, halting the apparatus and signifying that a malfunction has occurred, namely, that the carriage is not in the full left position.

If the carriage is in the full left position or after correction of the malfunction and closure of override switch 210, the stepping switch will move on to stage 4. Under the control of levels 1 and 2 of the stepping switch it will be noted at stage 4 that the left cylinder 11B and the center cylinder 11C will be operated to move the pickup heads 10A and 10B downwardly as shown in FIG. 16. In this connection, conductor g at level 1, stage 4 of the stepping switch is connected to a solenoid of a valve 220 which controls the passage of air under pressure from conduit 216 so that air will be directed to the top of cylinder 11B to move carriage support 75' downwardly, the other side of the solenoid being connected to the source line L1 by conductor 220'. Similarly, at level 2, stage 4, of the stepping switch, conductor i will establish connection between the common ground line and the solenoid of a solenoid valve 219, which will control the passage of air under pressure to the upper end of cylinder 11C to cause downward movement of the center carriage support 78, the other side of valve 219 also being connected to source line L1 by the conductor 220'.

The stepping switch will then move on to stage 5 where at level 6 the conductor s will be connected to the common ground. Conductor s leads from one side of a solenoid of the valve 213A and the other side of the solenoid is connected via a conductor 217 to the source line L1 so that the valve 213A will be shifted to interrupt communication of vacuum conduit 212 with the manifold 68 of pickup head 10A and whereby communication will be established between such manifold and an air conduit 218, thus subjecting the pickup elements of head 10A to positive pressure whereby to eject the fruit therefrom when the head 10A is in the receptacle, as shown in FIG. 16.

Also at stage 5 of the stepping switch and more particularly at level 2 thereof, conductor $h$ will be connected to the common ground and at level 1 conductor $f$ will be connected to the common ground, these conductors $h$ and $f$ respectively leading to solenoid valves 219 and 220, previously described, so as to reverse the operation of the left and center cylinders 11B and 11C and raise the pickup heads 75′ and 78 to the position shown in FIG. 15. It will be noted, however, that as distinguished from what is shown in FIG. 15, the pickup head 75′ will have picked up from the chute B a pattern of fruit to be deposited in the receptacle following movement of the heads 10A and 10B to the right hand position.

As previously described, the chutes A and B are operable by actuator cylinders 51 to squeeze the rows of fruit transversely between the side walls of the chute to establish a precise fruit pattern. This function is accomplished as a consequence of the movement of the heads 10A and 10B under the influence of the actuator cylinder 12 and yoke 103 to the left, at stage 2 in the operation of the stepping switch described above, responsive to the closure of the microswitch 173 by the lug 171, previously referred to. In this connection, it will be noted that a circuit leading from source line L1 and comprising conductors 173′ includes a solenoid valve 51′ and a ground line 173″ leading from the solenoid to ground. When lug 171 closes the circuit to energize the solenoid valve 51′, air will be supplied from an air supply line 51″ to the cylinders 51 to actuate the chute operating cylinders 51 and move the side walls of the chutes toward one another. It will also be noted that this function occurs as the heads move to the left and the next function of the stepping switch which effects the pick up of fruit is at stage 4 at which the heads are moved downwardly to cause engagement of the pickup head with the fruit which are compressed into a precise pattern.

The five stages described above which involved: movement of the pickup heads to the left; downward movement of the pickup heads; discharge of the fruit from the head 10A; the pickup of compressed fruit by the head 11B; and upward movement of the pickup heads, will then be repeated through stages 6-10 of the stepping switch as will now be described.

In this connection, it will be noted that at stage 6 the first operation is similar to the operation at stage 1 except that at stage 6 the heads are in the left hand position and, therefore, the microswitches 150B and 150C are operative to determine that the heads are fully elevated. Microswitches 150B and 150C are in the circuit which includes conductor $p$ leading to the common ground and the conductors leading from conductor 206 in the test circuit which include the malfunction light 207, the light 209, the overriding switch 210, and the related holding relays 202 and 208 which now function in the manner previously described.

In addition, at level 6 conductor $r$ connects vacuum switch 210B to the supply conductor L1 and the test circuit including conductor 206, the malfunction light 207, the holding relays 202 and 208, and overriding switch 210 so as to determine that there is no vacuum leak and that the pickup head 10B has picked up from the chute B a complete fruit pattern.

At stage 7 of the stepping switch, the level 4 conductor $n$ establishes the circuit between source line L1 and the common ground via conductor 215 leading from the line L1 to solenoid valve 214 which will be actuated whereby the cylinder 12 will move the yoke 103 to the right. At stage 8, level 5, of the stepping switch, the circuit including conductor $q$ will be established whereby the microswitch 172 will determine whether the movement of the heads has been completed, that is, whether the heads are in the full right position.

At stage 9 in levels 2 and 3 of the stepping switch, the center cylinder 11C and the right hand cylinder 11A will be operated to move the heads downwardly so that the right hand head will pick up a second layer of fruit from chute A, which layer has been previously compressed on the chute responsive to movement of the lug 170 on yoke 103 into a position to operate microswitch 173, and the fruit in the pickup head 11B will be moved into the receptacle. Such movements of heads 10A and 10B will be caused by energization of solenoid valve 220 previously described which is in circuit with conductor 220′ and ground conductor $i$ and energization of a solenoid valve 221 which controls cylinder 11A and which is in circuit with conductor 220′ and ground conductor $k$.

Finally, at position 10 at level 6, conductor $t$ which leads to a solenoid valve 213B will complete the circuit with the conductor 217 leading to source line L1 so that air from air line 218 will be supplied to the pickup head 10B when the same is in the downward position so that the fruit will be ejected from the pickup head into the receptacle.

The stepping switch will thus progress through its twenty stages. As herein illustrated, stages 11–15 are exactly the same as stages 1–5 and stages 16–20 are exactly the same as stages 6–10.

Inasmuch as twenty stepping switch stages or two left hand and two right hand series of stages have been illustrated, it will be appreciated that four layers alternating between pattern A and pattern B will be packed in the receptacle. If it be desired that more than four layers be packed in the receptacle, it will be understood that it is only necessary to increase the series of stages.

It will now be understood that the apparatus provides means for cyclically and progressively packing in a receptacle a layer from chute A and then a layer from chute B and wherein during the cyclic operation of the head moving mechanisms, the fruit pattern will be established on the respective chutes so as to aid in the efficient operation of the apparatus in the sense that the heads will pick up a full pattern of fruit with certainty. In addition, however, in the event that variation in fruit size or other transient condition should cause a malfunction of the apparatus, including either the failure of a head to pick up a fruit pattern, equivalent vacuum leak, or failure of the heads to move either fully up or fully to the left and right, the apparatus will be protected by the test mechanisms and circuits which will cause the machine to cease operation until the malfunction has been corrected.

As a consequence of the foregoing, the present invention provides an apparatus which will efficiently and repeatedly package large quantities of articles such as fruit without necessitating the handling of the fruit by skilled packers and without necessitating manipulation of the packing apparatus by a machine operator. Indeed, comparatively unskilled personnel may be employed to simply watch the machine and correct any malfunction which might cause it to stop and to move into position an empty receptacle following the complete packing and removal of a full receptacle.

While specific details of the apparatus as well as specific control system have been herein shown and described, it will be understood that the apparatus may be structurally modified without departing from the spirit of the invention and, likewise, specifically different control circuitries may be employed without departing from the invention, all as may be embraced within the appended claims.

What is claimed is:

1. Apparatus for packing layers of articles in a receptacle, comprising: a support for said receptacle; chute means for supplying articles and disposing the same in spaced groups of predetermined patterns corresponding respectively to successive layers of articles to be transferred to said receptacle; a pair of pickup heads having means engageable with the respective groups of articles to pick up the latter; means supporting said pickup heads including three spaced vertically movable carriage supports, respectively overlying said chute means and said receptacle support, and intermediate stationary carriage support means between said spaced movable carriage supports; each of said pickup heads having a carriage engageable with said movable carriage supports and with said stationary carriage supporting means to enable movement of said carriages between alternate positions overlying said chute means and said receptacle support when said carriages are in an upper position; means for effecting such movement of said carriages; means engageable with said movable carriage supports to effect vertical movement thereof from an upper position to move one of said pickup heads toward said chute means to engage one of said pickup heads with one of said groups of articles and to move the other of said pickup heads into said receptacle; and means for causing said one pickup head to pick up said group of articles and causing said other pickup head to release articles, and for moving said carriage supports back to said upper position.

2. Apparatus as defined in claim 1, wherein said means for effecting such movement of said carriages comprises means separably connectable to said carriages when said carriage supports are in said upper position.

3. Apparatus as defined in claim 1, wherein said means for effecting such movement of said carriages comprises a fluid pressure operated actuator cylinder and a member shiftable by said actuator cylinder; said member having means separably connectable to said carriages when said carriage supports are in said upper position.

4. Apparatus for packing layers of articles in a receptacle, comprising: a support for said receptacle; chute means for supplying articles and disposing the same in spaced groups of predetermined patterns corresponding respectively to successive layers of articles to be transferred to said receptacle; a pair of pickup heads having means engageable with the respective groups of articles to pick up the latter; means supporting said pickup heads including three spaced vertically movable carriage supports, respectively overlying said chute means and said receptacle support, and intermediate stationary carriage support means between said spaced movable carriage supports; each of said pickup heads having a carriage engageable with said movable carriage supports and with said stationary carriage supporting means to enable movement of said carriages between alternate positions overlying said chute means and said receptacle support when said carriages are in an upper position; means for effecting such movement of said carriages; means engageable with said movable carriage supports to effect vertical movement thereof from an upper position to move one of said pickup heads toward said chute means to engage one of said pickup heads with one of said groups of articles and to move the other of said pickup heads into said receptacle; means for causing said one pickup head to pick up said group of articles and causing said other pickup head to release articles, and for moving said carriage supports back to said upper position; and means for preventing such movement of said carriages between said alternate positions upon failure of either of said carriages to return to said upper position.

5. Apparatus as defined in claim 4, wherein said means for preventing such movement of said carriages comprises a shiftable member carried by each carriage; means engaged with said shiftable member operable upon movement of said carriages to said upper position for shifting said shiftable member; and control means operable by said shiftable member responsive to such shifting.

6. Apparatus as defined in claim 5, wherein said shiftable member comprises a pin carried by the respective carriage, and said means engaged with said shiftable pin comprises a lever also carried by the respective carriage and engaged with said pin; and said means for shifting said pin includes abutment means engageable with said lever to shift said pin upon movement of said respective carriage to said upper position.

7. Apparatus for packing layers of articles in a receptacle, comprising: a support for said receptacle; chute means for supplying articles and disposing the same in spaced groups of predetermined patterns corresponding respectively to successive layers of articles to be transferred to said receptacle; a pair of pickup heads having means engageable with the respective groups of articles to pick up the latter; means supporting said pickup heads including three spaced vertically movable carriage supports, respectively overlying said chute means and said receptacle support, and intermediate stationary carriage support means between said spaced movable carriage supports; each of said pickup heads having a carriage engageable with said movable carriage supports and with said stationary carriage supporting means to enable movement of said carriages between alternate positions overlying said chute means and said receptable support when said carriages are in an upper position; means for effecting such movement of said carriages; means engageable with said movable carriage supports to effect vertical movement thereof from an upper position to move one of said pickup heads toward said chute means to engage one of said pickup heads with one of said groups of articles and to move the other of said pickup heads into said receptacle; and means for causing said one pickup head to pick up said group of articles and causing said other pickup head to release articles, and for moving said carriage supports back to said upper position; and means for preventing such alternate movement of said carriages upon failure of said carriages to fully move to positions overlying said chute means and said receptacle support.

8. Apparatus as defined in claim 7, wherein said means for preventing such movement comprises control means disposed in the path of said means for effecting such movement of said carriages.

9. Apparatus for packing layers of articles in a receptacle, comprising: a frame structure having upper, intermediate, and lower support means; said lower support means having means for supporting a receptacle; said intermediate support means having a pair of spaced-apart chute means for supplying and predisposing articles in groups corresponding to layers of said articles to be placed in said receptacle; said supper support means having a vertically movable carriage support above each of said chute means and a central vertically movable carriage support above said receptable support and also having stationary carriage supports extending between said vertically movable carriage supports; a pair of pickup heads each having a plurality of pickup elements arranged in a pattern corresponding to the pattern of said groups of articles; a carriage on each head movably mounted on said carriage supports; means for moving said pair of pickup head carriages alternately along said stationary carriage supports between positions at which said pair of heads are respectively supported by one of said carriage supports above said chute means and said central carriage support, and the other of said carriage supports above said chute means and said central carriage support; means mounted on said upper support means and engaged with the respective vertically movable carriage supports for moving said central carriage support and said spaced carriage supports between upper positions and positions for engaging one group of said articles on one chute means and disposing another group of said articles in said receptacle and then returning said carriage supports to an upper position; and means for effecting cyclical operation of said apparatus to pack a plurality of groups of said articles in said receptacle.

10. Apparatus as defined in claim 9, wherein said means for effecting cyclical operation comprises control means for interrupting operation of said apparatus upon failure of said carriages to fully move between said alternate positions.

11. Apparatus as defined in claim 9, wherein said means for effecting cylical operation comprises means for preventing operation of said means for moving said pickup head carriages between said alternate positions upon failure of either of said vertically movable carriage supports to return to the upper position.

12. Apparatus as defined in claim 9, wherein said means for effecting cyclical operation comprises means for interrupting operation of said apparatus upon failure of any of said pickup elements to pick up an article.

13. Apparatus as defined in claim 9, wherein said means for moving said pickup heads between said alternate positions and said means for moving said vertically movable carriage supports respectively comprise fluid pressure operated cylinders; electrically operated valve means for controlling the operation of each of said cylinders; and sequently operable switch means for controlling the operation of said valve means.

14. Apparatus for packing layers of articles in a receptacle, comprising: a support for a receptacle; chute means for supporting a supply of articles; pickup means movable into engagement with said articles on said chute means and operable to pick up a group of said articles; means for moving said pickup means with said articles supported thereby to a position overlying said receptacle; guide means disposed above said receptacle in the path of said pickup means for guiding the latter into said receptacle; and means for moving said guide means vertically in to and out of engagement with said receptacle to permit the removal of a full receptacle and the placement beneath said guide means of an empty receptacle.

15. Apparatus as defined in claim 14, wherein said means for moving said guide means vertically comprises means automatically responsive to the placement of a number of layers of articles in said receptacle.

16. Apparatus for packing layers of articles in a receptacle, comprising: a support for a receptacle; chute means for supplying articles and predisposing the articles in groups of a predetermined pattern corresponding to a layer of articles to be transferred to said receptacle; means for successively transferring said groups of articles to said receptacle, including pickup means operable to successively pick up said groups of articles and to deposit said articles in said receptacle; and means for sequentially moving said pickup means into engagement with said groups of articles to pick up said successive groups of articles, alternately moving said pickup means to positions above said chute means and above said receptacle support, and for moving said pickup means to a position for depositing said successive groups of articles in said receptacle; said means for sucessively transferring groups of articles comprising carriage support means extending between said receptacle support and said chute means; said pickup means including a carriage movable on said carriage support means; said carriage support means having a stationary portion and movable portions; and said means for sequentially moving said pickup means including means for moving said movable portions of said carriage support means toward and away from said chute means and said receptacle support.

17. Apparatus for packing layers of articles in a receptacle, comprising: a support for a receptacle; chute means for supplying articles and predisposing the articles in groups of a predetermined pattern corresponding to a layer of articles to be transferred to said receptacle; means for successively transferring said groups of articles to said receptacle, including pickup means operable to successively pick up said groups of articles and to deposit said articles in said receptacle; and means for sequentially moving said pickup means into engagement with said groups of articles to pick up said successive groups of articles, alternately moving said pickup means to positions above said chute means and above said receptacle support, and for moving said pickup means to a position for depositing said successive groups of articles in said receptacle; said means for successively transferring groups of articles comprising carriage support means extending between said receptacle support and said chute means; said pickup means including a carriage movable on said carriage support means; said carriage support means having a stationary portion and movable portions; said means for sequentially moving said pickup means including means for moving said movable portions of said carriage support means toward and away from said chute means and said receptacle support; and said means for moving said pickup means to a position above said receptacle support including means engageable with said carriage.

18. Apparatus for packing layers of articles in a receptacle, comprising: a support for a receptacle; chute means for supplying articles and predisposing the articles in groups of a predetermined pattern corresponding to a layer of articles to be transferred to said receptacle; means for successively transferring said groups of articles to said receptacle, including pickup means operable to successively pick up said groups of articles and to deposit said articles in said receptacle; and means for sequentially moving said pickup means into engagement with said groups of articles to pick up said successive groups of articles, alternately moving said pickup means to positions above said chute means and above said receptacle support, and for moving said pickup means to a position for depositing said successive groups of articles in said receptacle; said means for successively transferring groups of articles comprising carriage support means extending between said receptacle support and said chute means; said pickup means including a carriage movable on said carriage support means; said carriage support means having a stationary portion and movable portions; said means for sequentially moving said pickup means including means for moving said movable portions of said carriage support means toward and away from said chute means and said receptacle support; and said means for moving said pickup means to a position above said receptacle support including means separably engageable with said carriage and releasable from the latter upon movement of said carriage support portions toward and away from said chute means and said receptacle support.

19. Apparatus for packing layers of articles in a receptacle, comprising: a support for a receptacle; chute means for supplying articles and predisposing the articles in groups of a predetermined pattern corresponding to a layer of articles to be transferred to said receptacle; means for successively transferring said groups of articles to said receptacle, including pickup means operable to successively pick up said groups of articles and to deposit said articles in said receptacle; and means for sequentially moving said pickup means into engagement with said groups of articles to pick up said successive groups of articles, alternately moving said pickup means to positions above said chute means and above said receptacle support, and for moving said pickup means to a position for depositing said successive groups of articles in said receptacle; said means for successively transferring groups of articles comprising spaced movable carriage supporting rail sections and intervening fixed rail sections; said pickup means including a carriage shiftably supported on said movable rail sections; and said means for sequentially moving said pickup means into engagement with said groups of articles and to a position for depositing said articles comprising means connected to said spaced movable carriage supporting rail sections for moving the same toward and away from said chute means when said pickup means carriage is supported on said spaced movable carriage supporting rail sections.

20. Apparatus for packing layers of articles in a receptacle, comprising: a support for a receptacle; chute means for supplying articles and predisposing the articles in groups of a predetermined pattern corresponding to a layer of articles to transferred to said receptacle; means for successively transferring said groups of articles to said receptacle, including pickup means operable to successively pick up said groups of articles and to deposit said articles in said receptacle; and means for sequentially moving said pickup means into engagement with said groups of articles to pick up said successive groups of articles, alternately moving said pickup means to positions above said chute means and above said receptacle support, and for moving said pickup means to a position for depositing said successive groups of articles in said receptacle; said means for successively transferring groups of articles comprising spaced movable carriage supporting rail sections and intervening fixed rail sections; said pickup means including a carriage shiftably supported on said movable rail sections; said means for sequentially moving said pickup means into engagement with said groups of articles and to a position for depositing said articles comprising means connected to said spaced movable carriage supporting rail sections for moving the same toward and away from said chute means when said pickup means carriage is supported on said spaced movable carriage supporting rail sections; and including means for preventing movement of said pickup means carriage when said spaced movable carriage supporting rail sections and said intervening rail sections are out of alignment.

21. Apparatus for packing layers of articles in a receptacle, comprising: a support for a receptacle; chute means for supplying articles and predisposing the articles in groups of a predetermined pattern corresponding to a layer of articles to be transferred to said receptacle; means for successively transferring said groups of articles to said receptacle, including pickup means operable to successively pick up said groups of articles and to deposit said articles in said receptacle; and means for sequentially moving said pickup means into engagement with said groups of articles to pick up said successive groups of articles, alternately moving said pickup means to positions above said chute means and above said receptacle support, and for moving said pickup means to a position for depositing said successive groups of articles in said receptacle; said means for successively transferring groups of articles comprising spaced movable carriage supporting rail sections and intervening fixed rail sections; said pickup means including a carriage shiftably supported on said movable rail sections; said means for sequentially moving said pickup means into engagement with said groups of articles and to a position for depositing said articles comprising means connected to said spaced movable carriage supporting rail sections for moving the same toward and away from said chute means when said pickup means carriage is supported on said spaced movable carriage supporting rail sections; and including means for preventing movement of said pickup means carriage to a position above said receptacle support upon failure of said pickup means to pick up a complete group of articles.

22. Apparatus for packing layers of articles in a receptacle, comprising: a support for a receptacle; chute means for supplying articles and predisposing the articles in groups of a predetermined pattern corresponding to a layer of articles to be transferred to said receptacle; means for successively transferring said groups of articles to said receptacle, including pickup means operable to successively pick up said groups of articles and to deposit said articles in said receptacle; and means for sequentially moving said pickup means into engagement with said groups of articles to pick up said successive groups of articles, alternately moving said pickup means to positions above said chute means and above said receptacle support, and for moving said pickup means to a position for depositing said successive groups of articles in said receptacle; said pickup means including a pair of pickup heads each having a carriage, three spaced movable carriage supports, and a pair of intervening stationary carriage supports on which said carriages are movable between positions above said chute means and above said receptacle support; and said means for moving said pickup means between said position including a separable connection with said movable carriage supports for effecting simultaneous movement of said pickup head carriages between said positions.

23. Apparatus for packing layers of articles in a receptacle, comprising: a support for a receptacle; chute means for supplying articles and predisposing the articles in groups of a predetermined pattern corresponding to a layer of articles to be transferred to said receptacle; means for successively transferring said groups of articles to said receptacle; including pickup means operable to successively pick up said groups of articles and to deposit said articles in said receptacle; and means for sequentially moving said pickup means into engagement with said groups of articles to pick up said successive groups of articles, alternately moving said pickup means to positions above said chute means and above said receptacle support, and for moving said pickup means to a position for depositing said successive groups of articles in said receptacle; said pickup means including a pair of pickup heads each having a carriage, three spaced movable carriage supports, and a pair of intervening stationary carriage supports on which said carriages are movable between positions above said chute means and above said receptacle support; and said means for moving said pickup means between said positions including a separable connection with said movable carriage supports for effecting simultaneous movement of said pickup head carriages between said positions; said chute means having means operable to compress said articles thereon into a precise pattern to be engaged by said pickup heads and including means operable when said pickup head carriages are supported on said spaced movable carriage supports for actuating said chute means to compress said articles into said pattern.

24. Apparatus for packing layers of articles in a receptacle, comprising: a support for a rectptacle; chute means for supplying articles and predisposing the articles in groups of a predetermined pattern corresponding to a layer of articles to be transferred to said receptacle; means for successively transferring said groups of articles to said receptacle, including pickup means operable to successively pick up said groups of articles and to deposit said articles in said receptacle; and means for sequentially moving said pickup means into engagement with said groups of articles to pick up said successive groups of articles, alternately moving said pickup means to positions above said chute means and above said receptacle support, and for moving said pickup means to a position for depositing said successive groups of articles in said receptacle; said pickup means including a pair of pickup heads each having a carriage, three spaced movable carriage supports, and a pair of intervening stationary carriage supports on which said carriages are movable between positions above said chute means and above said receptacle support; said chute means having means operable to compress said articles thereon into a precise pattern to be engaged by said pickup heads and including means operable when said pickup head carriages are supported on said spaced movable carriage supports for actuating said chute means to compress said articles into said pattern.

25. Apparatus for packing layers of articles in a receptacle, comprising: a support for a receptacle; chute means for supporting a supply of articles; pickup means movable into engagement with said articles on said chute means and operable to pick up a group of said articles; means for moving said pickup means with said articles supported thereby to a position overlying said receptacle; guide means disposed above said receptacle in the path of said pickup means for guiding the latter into said receptacle; and means to cause relative substantially vertical movement between said guide means and said support for a receptacle for bringing said receptacle into engagement with the guide means to receive layers of fruit and for bringing the receptacle out of engagement with the guide means to permit removal of a full receptacle and the placement beneath said guide means of an empty receptacle.

26. In an apparatus of the character described for packing layers of articles in boxes, the combination of:
   a first article supply means for arranging articles therein in longitudinal staggered rows forming successive groups of the articles of a first pattern oriented diagonally of the longitudinal rows;
   a second article supply means for arranging articles therein in longitudinal staggered rows forming successive groups of the articles of a second pattern oriented diagonally of the longitudinal rows,
   said two patterns being complementary to each other to permit the groups of the two patterns to nest together vertically in a box;
   a first pickup means having pickup elements arranged in said first pattern to pick up said first groups of articles;
   a second pickup means having pickup elements arranged in said second pattern to pick up said second groups of said articles;
   means halfway between said first and second article supply means to support a box into which the articles are to be packed with the bottom of the box spaced substantially below the level of the two article supply means;
   means to maintain the two pickup means spaced apart constantly by a distance to permit one pickup means to be positioned above said box while the other pickup means is positioned above one of said article supply means;
   means to reciprocate the two pickup means in unison between first limit positions with the first pickup means above the first article supply means and the second pickup means above said box and second limit positions with the first pickup means above the box and the second pickup means above the second article supply means;
   means effective when the two pickup means are at their first limit positions to lower the first pickup means temporarily from a normal elevation a given vertical distance to pick up articles from the first article supply means and to lower the second pickup means temporarily from a normal elevation a greater vertical distance to deposit in the box a group of articles of said first pattern; and
   means effective when the two pickup means are at their second limit positions to lower the second pickup means temporarily from a normal elevation a given vertical distance to pickup articles from the second article supply means and to lower the first pickup means temporarily from a normal elevation a greater vertical distance to deposit in the box a group of articles of said second pattern.

27. A combination as set forth in claim 26 which includes control means to reciprocate the two pickup means between their first and second limit positions and to raise and lower the two pickup means automatically to carry out a cycle for completely packing a box on said support.

28. A combination as set forth in claim 26 in which the means to reciprocate the two pickup means is operatively connected to said distance maintaining means for reciprocation thereof.

29. A combination as set forth in claim 27 which includes means to prevent reciprocation of said distance maintaining means upon failure of either of the two pickup means to return to its normal elevation.

30. A combination as set forth in claim 26 in which each of said two articles supply means has means to compress the groups of articles thereon into compact patterns; and
   which includes means operable for actuating said compressing means when the two pickup means are elevated.

References Cited

UNITED STATES PATENTS

| 2,938,315 | 5/1960 | Voullaire | 53—247 X |
| 2,951,323 | 9/1960 | Haab | 53—61 |
| 3,183,640 | 5/1965 | Gee et al. | 53—164 X |
| 3,292,341 | 12/1966 | Frost | 53—165 X |
| 3,300,945 | 1/1967 | Grossi et al. | 53—247 X |
| 3,327,450 | 6/1967 | Carter | 53—247 X |

TRAVIS S. McGEHEE, *Primary Examiner.*

U.S. Cl. X.R.

53—77, 124, 165, 247, 255

PO-1050
(5/69)

UNITED STATES PATENT OFFICE
CERTIFICATE OF CORRECTION

Patent No. 3,453,802          Dated July 8, 1969

Inventor(s) Fred W. Riddington

It is certified that error appears in the above-identified patent and that said Letters Patent are hereby corrected as shown below:

Column 1, line 61, "first" should read --fruit--.
Column 7, line 50, "71' " should read --70'--; lines 62 and 63, delete "or in the center position, respectively,".
Column 16, line 55, "supper" should read --upper--.

SIGNED AND
SEALED
MAR 24 1970

(SEAL)
Attest:

Edward M. Fletcher, Jr.
Attesting Officer

WILLIAM E. SCHUYLER, JR.
Commissioner of Patents